(12) United States Patent
Inamori

(10) Patent No.: US 11,015,634 B2
(45) Date of Patent: May 25, 2021

(54) PLATE MEMBER JOINING STRUCTURE

(71) Applicant: Toyota Jidosha Kabushiki Kaisha, Toyota (JP)

(72) Inventor: Shigeru Inamori, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 16/502,592

(22) Filed: Jul. 3, 2019

(65) Prior Publication Data

US 2020/0011361 A1  Jan. 9, 2020

(30) Foreign Application Priority Data

Jul. 5, 2018 (JP) .............................. JP2018-128427

(51) Int. Cl.
  *F16B 25/00* (2006.01)
  *B65D 43/02* (2006.01)
  *F16B 25/10* (2006.01)

(52) U.S. Cl.
  CPC ...... *F16B 25/0021* (2013.01); *B65D 43/0235* (2013.01); *F16B 25/106* (2013.01)

(58) Field of Classification Search
  USPC ....................................................... 411/386
  See application file for complete search history.

(56) References Cited

U.S. PATENT DOCUMENTS

| | | | | |
|---|---|---|---|---|
| 3,156,152 A | * | 11/1964 | Edgar ................... | F16B 25/106 411/386 |
| 3,286,579 A | * | 11/1966 | Lovisek .............. | F16B 25/0047 411/386 |
| 3,362,737 A | * | 1/1968 | Cobb ........................ | F16B 5/02 403/373 |
| 3,544,053 A | * | 12/1970 | Ingalls ...................... | F16B 5/02 248/219.3 |
| 3,572,778 A | * | 3/1971 | Cassel .................... | F01M 11/00 285/382 |
| 4,080,768 A | * | 3/1978 | Trixl ...................... | B29C 65/562 52/521 |
| 4,749,322 A | * | 6/1988 | Sygnator .................. | F16B 5/02 411/387.3 |
| 4,792,475 A | * | 12/1988 | Bien .................... | B62D 29/048 403/408.1 |

(Continued)

FOREIGN PATENT DOCUMENTS

| | | |
|---|---|---|
| CN | 103240578 A | 8/2013 |
| JP | 2017-025994 A | 2/2017 |

*Primary Examiner* — Gary W Estremsky
(74) *Attorney, Agent, or Firm* — Dinsmore & Shohl LLP

(57) ABSTRACT

A plate member joining structure includes a lower plate that is made of metal, a fitting base portion being formed at an upper surface of the lower plate; an upper plate that is made of metal, that is disposed on the upper surface of the lower plate, and that has a fitting insert portion that is fitted to the fitting base portion so as to form a first gap between a lower surface of the fitting insert portion and a surface of the fitting base portion facing the lower surface of the fitting insert portion; and a screw that, in a state in which the fitting insert portion is fitted to the fitting base portion, is screwed into the fitting insert portion and the fitting base portion, and joins the fitting insert portion and the fitting base portion together in a plate thickness direction.

11 Claims, 5 Drawing Sheets

(56) References Cited

U.S. PATENT DOCUMENTS

| | | | | |
|---|---|---|---|---|
| 4,998,332 | A | * | 3/1991 | Dacey, Jr. ............ B62D 25/163 |
| | | | | 29/525.02 |
| 5,628,581 | A | * | 5/1997 | Hintz ....................... E04B 9/02 |
| | | | | 403/380 |
| 5,951,225 | A | * | 9/1999 | Osterle ................ E04D 3/3603 |
| | | | | 411/531 |
| 8,857,040 | B2 | * | 10/2014 | Freis ......................... F16B 5/02 |
| | | | | 29/525.11 |
| 9,488,210 | B2 | | 11/2016 | Freis |
| 2008/0222873 | A1 | * | 9/2008 | Draht ..................... F16B 19/14 |
| | | | | 29/432 |
| 2013/0195579 | A1 | * | 8/2013 | Freis ......................... F16B 5/02 |
| | | | | 411/387.1 |
| 2017/0106430 | A1 | * | 4/2017 | Norton ................ F16B 25/0084 |
| 2017/0130751 | A1 | * | 5/2017 | Norton ..................... B29C 65/56 |
| 2019/0211864 | A1 | * | 7/2019 | Kagami ............. F16B 25/0021 |

* cited by examiner

PLATE MEMBER JOINING STRUCTURE

CROSS-REFERENCE TO RELATED APPLICATION

This application is based on and claims priority under 35 USC 119 from Japanese Patent Application No. 2018-128427 filed on Jul. 5, 2018, the disclosure of which is incorporated by reference herein.

BACKGROUND

Technical Field

The present disclosure relates to a plate member joining structure.

Related Art

U.S. Pat. No. 9,488,210 discloses a joining method that uses the FDS (Flow Drilling Screw) method. Concretely, a screw is press-fit in (screwed-in), while being rotated at a high speed, into a joined portion at which plate members that are made of metal are superposed vertically. The joined portion is welded by the heat of the friction with the screw, and the excess metal that is pushed-out by the screw accrues at the distal end side of the screw. This excess metal functions as a so-called weld nut, and the plate members are joined together.

By the way, at the time of screwing-in the screw, there are cases in which the excess metal that is pushed-out by the screw enters-in between the plate members. In this case, a gap is formed between the plate members, and therefore, problems arise with respect to the rigidity of the joined portion that is joined by the screw and the accuracy of joining the plate members together.

With regard to this point, in the above-described related art, the formation of the above-described gap is suppressed by providing a concave portion at the lower surface of the plate member that is disposed at the lower side so as to reduce the plate thickness, and reducing the amount of the excess metal that is pushed-out by the screw.

However, in the above-described related art, because the plate thickness of the plate member that is disposed at the lower side is reduced at the joined portion, the contact surface area between the screw and the plate members, i.e., the joined surface area that results from the joining, is reduced.

Therefore, the joining strength is reduced. Further, with a structure that simply reduces the plate thickness of the joined portion, the rigidity of the joined portion decreases.

SUMMARY

In view of the above-described circumstances, the present disclosure provides a plate member joining structure that, in a structure in which a lower plate and an upper plate are superposed together and are joined by the screwing-in of a screw, can suppress the formation of a gap between the plate members and can improve the joining strength and the rigidity of the joined portion.

A plate member joining structure relating to a first aspect of the present disclosure is structured to include: a lower plate that is made of metal, a fitting base portion being formed at an upper surface of the lower plate; an upper plate that is made of metal, that is disposed on the upper surface of the lower plate, and that has a fitting insert portion that is fitted to the fitting base portion so as to form a first gap between a lower surface of the fitting insert portion and a surface of the fitting base portion facing the lower surface of the fitting insert portion; a screw that, in a state in which the fitting insert portion is fitted to the fitting base portion, is screwed into the fitting insert portion and the fitting base portion, and joins the fitting insert portion and the fitting base portion together in a plate thickness direction.

In the plate member joining structure relating to the first aspect of the present disclosure, the fitting base portion is formed in the upper surface of the lower plate. The fitting insert portion, which is formed at the lower surface of the upper plate, is fitted to the fitting base portion. A screw is screwed into the fitting insert portion and the fitting base portion.

At this time, the region of contact is welded by the heat of the friction with the screw. Further, at the region of contact, the excess metal, which is pushed-out toward the distal end side of the screw, functions as a so-called weld nut. The fitting insert portion and the fitting base portion are thereby joined in the plate thickness direction by the screw and the excess metal.

Here, in the present aspect, the first gap is formed between the lower surface of the fitting insert portion and the surface, which faces that lower surface, at the fitting base portion. Therefore, the excess metal, which is pushed-out between the fitting insert portion and the fitting base portion by the screw, is accommodated in the first gap. Due thereto, an unnecessary gap being formed between the lower plate and the upper plate at the other regions of the lower plate and the upper plate is suppressed.

Further, the contact surface area between the screw and the lower plate and the upper plate, i.e., the joined surface area that results from the joining, increases by an amount corresponding to the excess metal that is accommodated in the first gap. Therefore, the joining strength of the joined portion is improved.

Moreover, the present aspect is structured such that, at the joined portion of the upper plate and the lower plate, the fitting insert portion that is formed at the upper plate is fit-together with the fitting base portion that is formed in the lower plate. Therefore, the rigidity of the joined portion is improved as compared with a case in which plate members that are flat-plate-shaped are superposed and joined together.

In a plate member joining structure relating to a second aspect of the present disclosure, in the plate member joining structure of the first aspect, the fitting base portion is a first concave portion that is formed at the upper surface of the lower plate, and the fitting insert portion is structured as a first convex portion that is formed at a lower surface of the upper plate.

In the plate member joining structure relating to the second aspect of the present disclosure, due to the first concave portion being provided in the upper surface of the lower plate, and the first convex portion being provided at the lower surface of the upper plate, the fitting insert portion of the upper plate can be fit-together with the fitting base portion of the lower plate. Due thereto, the fit-together state of the lower plate and the upper plate can be obtained by a simple structure.

In a plate member joining structure relating to a third aspect of the present disclosure, in the plate member joining structure of the second aspect, the first concave portion is formed in a shape of an upside-down truncated cone, and the first convex portion is formed in a shape of an upside-down truncated cone.

In the plate member joining structure relating to the third aspect of the present disclosure, the first concave portion that is shaped as an upside-down truncated cone is formed in the upper surface of the lower plate. The first convex portion, which is shaped as an upside-down truncated cone and is formed at the lower surface of the upper plate, is fit-together with this first concave portion. Namely, the diameter of the inner side surface of the first concave portion gradually increases from the bottom surface of the first concave portion toward the plate thickness direction upper side. The first concave portion and the first convex portion are fit-together at surfaces that are inclined with respect to the plate thickness direction of the joined portion. Therefore, the first concave portion and the first convex portion can be fit-together while absorbing dispersion that arises at the time of the manufacturing thereof, as compared with a case in which, for example, the first concave portion and the first convex portion are fit-together at side surfaces that run along the plate thickness direction. Due thereto, the workability of the joining process is good, and the mass produceability is improved.

In a plate member joining structure relating to a fourth aspect of the present disclosure, in the plate member joining structure of the second aspect or the third aspect, a second concave portion is formed at an upper surface of the upper plate at a position corresponding to the first convex portion as seen in a plan view, and, in a state in which the screw is screwed-into the second concave portion, a head portion of the screw abuts a peripheral edge portion of the second concave portion at the upper surface of the upper plate, and a second gap is formed between the head portion of the screw and a bottom surface of the second concave portion.

In the plate member joining structure relating to the fourth aspect of the present disclosure, the second concave portion is formed in the upper surface of the upper plate. This second concave portion is formed at a position that, as seen in a plan view, overlaps the first convex portion that is formed at the upper surface of the upper plate. Therefore, in the state in which the lower plate and the upper plate are joined together, the screw is in a state of being screwed-into the second concave portion.

Here, in the present aspect, the head portion of the screw abuts the peripheral edge portion of the second concave portion at the upper surface of the upper plate, and the second gap is formed between the head portion of the screw and the bottom surface of the second concave portion. Therefore, at the time when the screw is screwed into the upper plate, the excess metal that is pushed-out to the upper surface of the upper plate is accommodated in the second gap. Due thereto, an unnecessary gap being formed between the head portion of the screw and the upper plate at other regions of the head portion and the upper plate is suppressed. Due thereto, even if the amount of the excess metal increases or decreases in accordance with the plate thickness of the upper plate, the contacting surfaces of the head portion of the screw and the upper surface of the upper plate are stably ensured.

Further, the second concave portion and the first convex portion of the upper plate are formed at positions that overlap as seen in a plan view. Therefore, the second concave portion and the first convex portion can be formed by drawing that uses a predetermined press mold, or the like. Therefore, because the second concave portion and the first convex portion can be formed at the upper plate in few steps, the mass produceability is improved.

In a plate member joining structure relating to a fifth aspect of the present disclosure, in the plate member joining structure of any one of the second aspect through the fourth aspect, a second convex portion is formed at a lower surface of the lower plate at a position that, as seen in a plan view, overlaps the first concave portion that is formed in the upper surface of the lower plate.

In the plate member joining structure relating to the fifth aspect of the present disclosure, the second convex portion is formed at the lower surface of the lower plate. This second convex portion is formed, as seen in a plan view, at a position of corresponding to the first concave portion that is formed in the upper surface of the lower plate. Therefore, in the state in which the lower plate and the upper plate are joined together, the screw is in a state of being screwed into the second convex portion. Therefore, as compared with a case in which the lower surface of the lower plate is formed to be flat, the range of contact between the lower plate and the screw is enlarged in the axial direction of the screw. Due thereto, the support rigidity of the screw by the lower plate and the upper plate increases, and accordingly, this contributes to an improvement in the joining strength of the joined portion.

Further, because the first concave portion and the second convex portion of the lower plate are formed at positions that overlap as seen in a plan view, they can be molded easily by drawing using a predetermined press mold, or the like.

Because the plate member joining structure of the first aspect of the present disclosure is structured as described above, in a structure in which a lower plate and an upper plate are superposed together and are joined by the screwing-in of a screw, the formation of a gap between the plate members can be suppressed, and the joining strength and the rigidity of the joined portion can be improved.

Because the plate member joining structure of the second aspect of the present disclosure is structured as described above, the fit-together state of the lower plate and the upper plate can be obtained by a simple structure.

Because the plate member joining structure of the third aspect of the present disclosure is structured as described above, the workability of the processes of joining the lower plate and the upper plate is good, and the mass produceability can be improved.

Because the plate member joining structure of the fourth aspect of the present disclosure is structured as described above, even if the amount of the excess metal increases or decreases in accordance with the plate thickness of the upper plate, the contacting surfaces of the head portion of the screw and the upper plate are stably ensured, and the mass produceability of the upper plate is improved.

Because the plate member joining structure of the fifth aspect of the present disclosure is structured as described above, the support rigidity of the screw by the lower plate is high, and accordingly, the strength of the joined portion can be improved, as compared with a case in which the lower surface of the lower plate is formed to be flat.

BRIEF DESCRIPTION OF THE DRAWINGS

Exemplary embodiments of the present disclosure will be described in detail based on the following figures, wherein.

DETAILED DESCRIPTION

A plate member joining structure relating to an embodiment of the present disclosure is described hereinafter by using FIG. 1 through FIG. 4. As shown in these drawings, in the plate member joining structure of the present embodiment, an end portion of an upper plate 12 is superposed on an end portion of a lower plate 10, and a screw 44 is screwed-into these superposed end portions. Further, the region where the screw 44 is screwed into is a joined portion 14 of the lower plate 10 and the upper plate 12.

Figure 1:
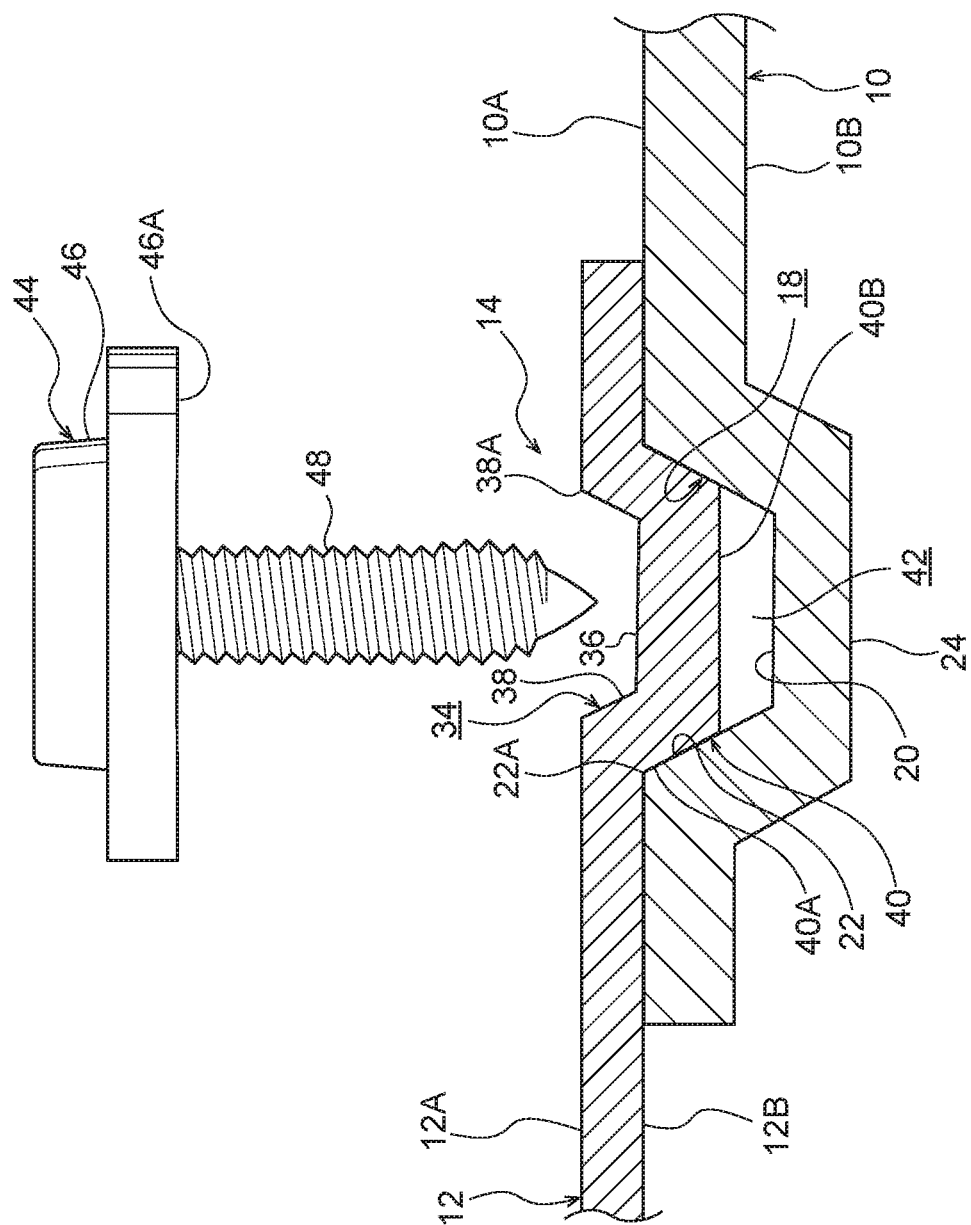
FIG. 1 is a side view that is seen from a plate thickness side and shows a state before joining of a lower plate and an upper plate relating to a present embodiment.

An overview of the lower plate 10 and the upper plate 12 will be given first. As shown in FIG. 1, the lower plate 10 is formed in the shape of a flat plate of a uniform plate thickness. This lower plate 10 is, for example, made of an aluminum alloy. However, it suffices for the lower plate 10 to be made of metal, and the lower plate 10 may be a steel plate, an iron plate, or the like.

A first concave portion 18 is formed in an upper surface 10A of the lower plate 10. The first concave portion 18 is formed in the shape of an upside-down truncated cone by a bottom surface 20 that is circular as seen in a plan view, and a side surface 22 that stands from the outer peripheral edge of the bottom surface 20 toward the upper side such that the diameter thereof gradually increases. Namely, the first concave portion 18 is formed in an upside-down trapezoidal shape in a cross-section along the plate thickness direction of the lower plate 10. Further, the upper end portion of the side surface 22 is a large diameter portion 22A.

The first concave portion 18 is formed by carrying out drawing on the upper surface 10A of the lower plate 10 by using an unillustrated press mold. Therefore, a second convex portion 24, which is shaped as an upside-down truncated cone and corresponds to the first concave portion 18, is formed at a lower surface 10B of the lower plate 10. In other words, the second convex portion 24 is formed at the lower surface 10B of the lower plate 10 at a position corresponding to the first concave portion 18 as seen in a plan view. Note that the first concave portion 18 and the second convex portion 24 may be formed by casting the lower plate 10.

On the other hand, the upper plate 12 is formed in the shape of a flat plate of a uniform plate thickness. This upper plate 12 is formed of an aluminum alloy for example. However, it suffices for the upper plate 12 to be made of metal, and the upper plate 12 may be a steel plate or an iron plate or the like.

A second concave portion 34 is formed in an upper surface 12A of the upper plate 12. The second concave portion 34 is formed in the shape of an upside-down truncated cone by a bottom surface 36 that is circular as seen in a plan view, and a side surface 38 that extends from the outer peripheral edge of the bottom surface 36 toward the upper side such that the diameter thereof gradually increases. Namely, the second concave portion 34 is formed in an upside-down trapezoidal shape in a cross-section along the plate thickness direction of the upper plate 12. Further, the upper end portion of the side surface 38 is a large diameter portion 38A.

The second concave portion 34 is formed by carrying out drawing on the upper plate 12 by using an unillustrated press mold. Therefore, a first convex portion 40, which is shaped as an upside-down truncated cone and corresponds to the second concave portion 34, is formed at a lower surface 12B of the upper plate 12. In other words, the first convex portion 40 is formed at the lower surface 12B of the upper plate 12 at a position corresponding to the second concave portion 34 as seen in a plan view. Note that the first convex portion 40 and the second concave portion 34 may be formed by casting the upper plate 12.

Figure 2:
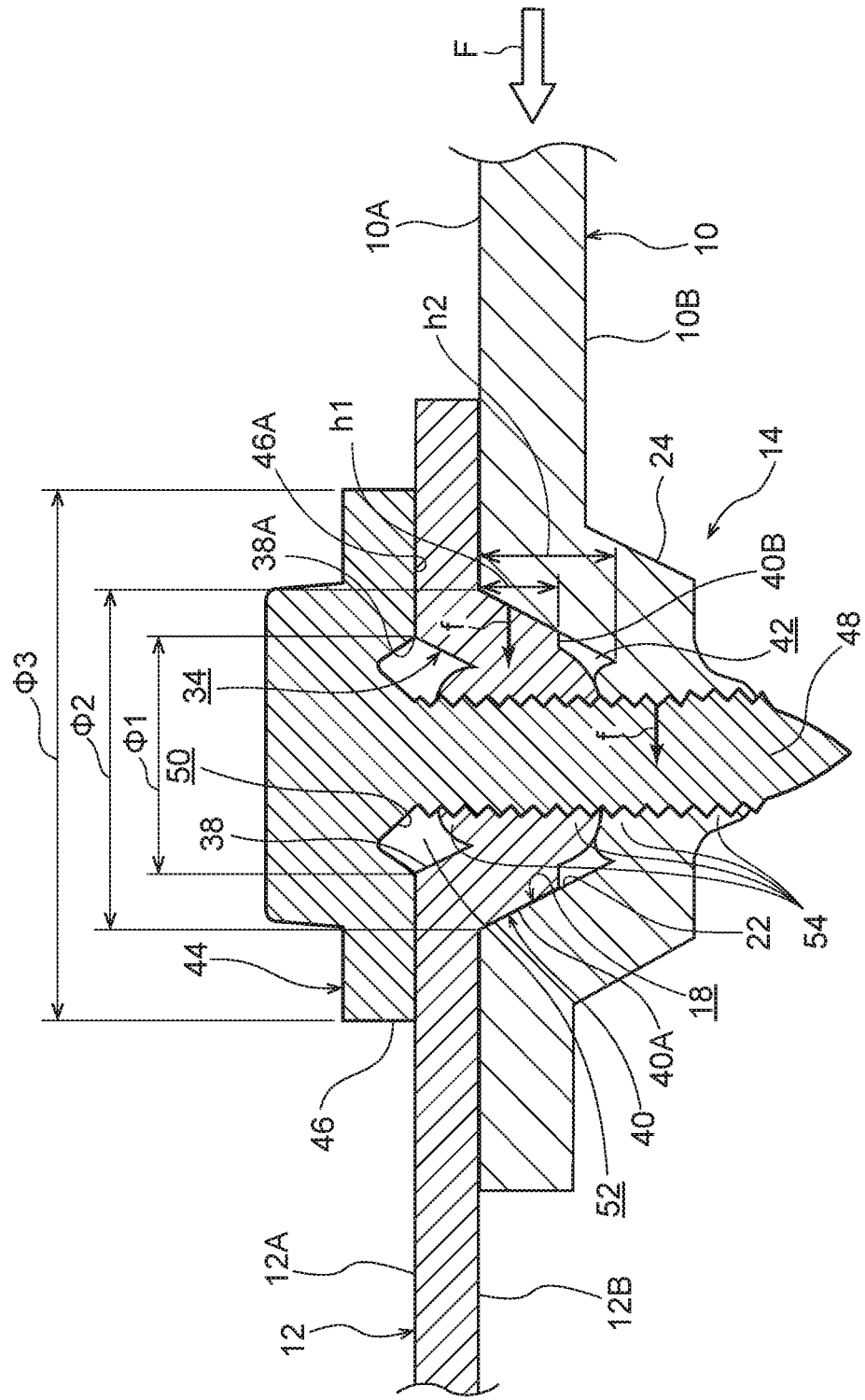
FIG. 2 is a vertical sectional view that is cut along a plate thickness direction and shows a plate member joining structure relating to the present embodiment.
Figure 3:
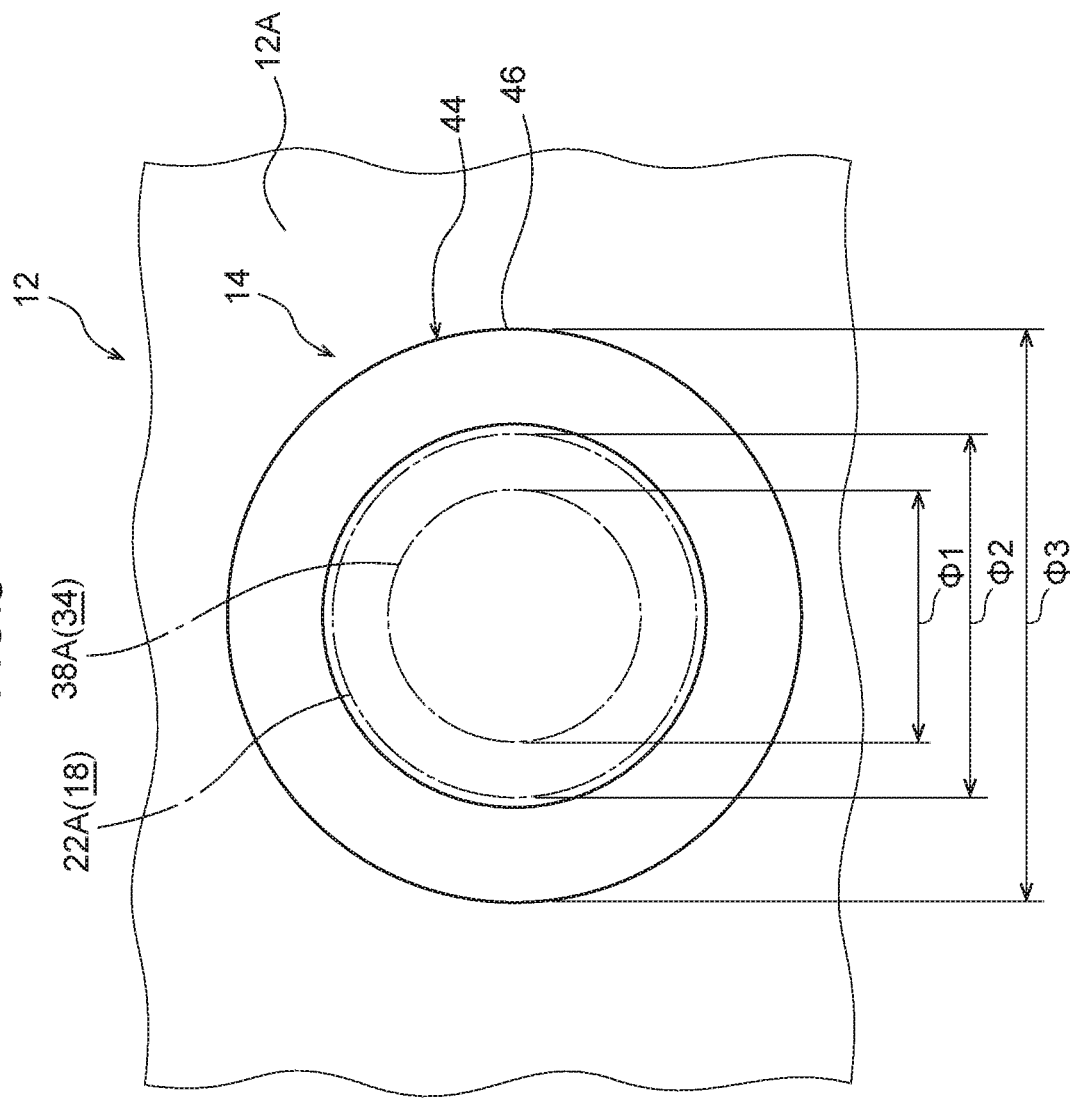
FIG. 3 is a schematic plan view of the joining structure shown in FIG. 2.

As shown in FIG. 2 and FIG. 3, inner diameter dimension $\Phi1$ of the large diameter portion 38A of the second concave portion 34 that is formed in the upper surface 12A of the upper plate 12 is set to be smaller than inner diameter dimension $\Phi2$ of the large diameter portion 22A of the first concave portion 18 that is formed in the upper surface 10A of the lower plate 10. Therefore, as seen in a plan view, the large diameter portion 38A of the second concave portion 34 of the upper plate 12 is disposed at the inner side of the large diameter portion 22A of the first concave portion 18 of the lower plate 10. Namely, the second concave portion 34 of the upper plate 12 is disposed at the inner side of the first concave portion 18 of the lower plate 10, as seen in a plan view.

On the other hand, an outer peripheral surface 40A of the first convex portion 40 that is formed at the lower surface 12B of the upper plate 12 is made to be a shape that runs along the inner peripheral surface (the side surface 22) of the first concave portion 18 that is formed in the upper surface 10A of the lower plate 10. Therefore, in the state in which the first convex portion 40 of the upper plate 12 is superposed from the upper side on the first concave portion 18 of the lower plate 10, the outer peripheral surface 40A of the first convex portion 40 abuts the side surface 22 of the first concave portion 18. Due thereto, the first convex portion 40 that is formed at the lower surface 12B of the upper plate 12 is fit together with the first concave portion 18 that is formed in the upper surface 10A of the lower plate 10.

Further, height dimension h1 in the plate thickness direction of the first convex portion 40 is set to be smaller than height dimension h2 in the plate thickness direction of the first concave portion 18 of the lower plate 10. Therefore, in the state in which the first convex portion 40 is fit together with the first concave portion 18, a first gap 42 is formed between a lower surface 40B of the first convex portion 40 and the bottom surface 20 of the first concave portion 18 that is disposed so as to face the lower surface 40B.

This first gap 42 is a space portion that is shaped as an upside-down truncated cone and that is formed between the first convex portion 40 and the first concave portion 18. Namely, the first gap 42 is formed in an upside-down trapezoidal shape, in a cross-section along the plate thickness direction of the lower plate 10 and the upper plate 12. Note that the first concave portion 18 that is formed in the lower plate 10 corresponds to the "fitting base portion" of the present disclosure, and the first convex portion 40 that is formed at the upper plate 12 corresponds to the "fitting insert portion".

The joined portion 14 of the above-described lower plate 10 and upper plate 12 is mechanically joined by the FDS (Flow Drilling Screw) method using the screw 44. Note that "FDS" is a registered trademark of EJOT Gmbh & Co. KG The screw 44 has a head portion 46 that is disc-shaped, and a shaft portion 48 that extends-out in the shape of a solid cylinder from a lower surface 46A of the head portion 46 and whose distal end portion is formed to be sharp.

As shown in FIG. 2, outer diameter dimension Φ3 of the head portion 46 of the screw 44 is set to be larger than the above-described inner diameter dimension Φ1 of the second concave portion 34 formed in the upper plate 12 and inner diameter dimension Φ2 of the first concave portion 18 formed in the lower plate 10. Moreover, a concave portion 50 that is disc-shaped is formed in the lower surface 46A of the head portion 46 so as to be adjacent to the outer peripheral edge of the shaft portion 48. The method of joining the lower plate 10 and the upper plate 12 is described concretely hereinafter.

First, the first convex portion 40, which is formed at the lower surface 12B of the upper plate 12, is superposed on the first concave portion 18 that is formed in the upper surface 10A of the lower plate 10. Next, the screw 44 is screwed-in in the plate thickness direction toward the lower plate 10 side from the upper plate 12 side. Due thereto, the shaft portion 48 of the screw 44 passes-through the second concave portion 34 of the upper surface 12A and the first convex portion 40 of the lower surface 12B of the upper plate 12, and moreover, passes-through the first concave portion 18 of the upper surface 10A and the second convex portion 24 of the lower surface 10B of the lower plate 10. Due thereto, the joining of the lower plate 10 and the upper plate 12 is completed, and the joined portion 14 is formed.

As shown in FIG. 3, at the joined portion 14, as seen in a plan view, the head portion 46 of the screw 44 is disposed so as to cover the second concave portion 34 that is formed in the upper surface 12A of the upper plate 12. Due thereto, the lower surface 46A of the head portion 46 abuts the peripheral edge portion of the second concave portion 34 (the large diameter portion 38A). Further, a second gap 52 is formed between the head portion 46 and the bottom surface 36 of the second concave portion 34. Excess metal 54, which is pushed-out (shaved-out) toward the upper surface 12A side of the upper plate 12 by the screw 44, is accommodated in this second gap 52.

Moreover, the excess metal 54, which is pushed-out between the first convex portion 40 of the upper plate 12 and the first concave portion 18 of the lower plate 10 by the screw 44, is accommodated in the first gap 42.

Further, the excess metal 54, which is pushed-out by the screw 44 toward the lower side of the second convex portion 24 that is formed at the lower surface 10B of the lower plate 10, is joined to the distal end side of the shaft portion 48 of the screw 44.

The above-described respective excess metals 54 are pushed-out to the first gap 42, the second gap 52 and the lower surface 10B side of the lower plate 10 while being fused by the heat of the friction with the screw 44, and are joined to the shaft portion 48 of the screw 44. Therefore, the excess metals 54 function as so-called weld nuts, and the screw 44 is fixed at a predetermined position. Due thereto, the lower plate 10 and the upper plate 12 are joined by the screw 44.

Operation and effects of the plate member joining structure relating to the present embodiment are described next.

Figure 4:
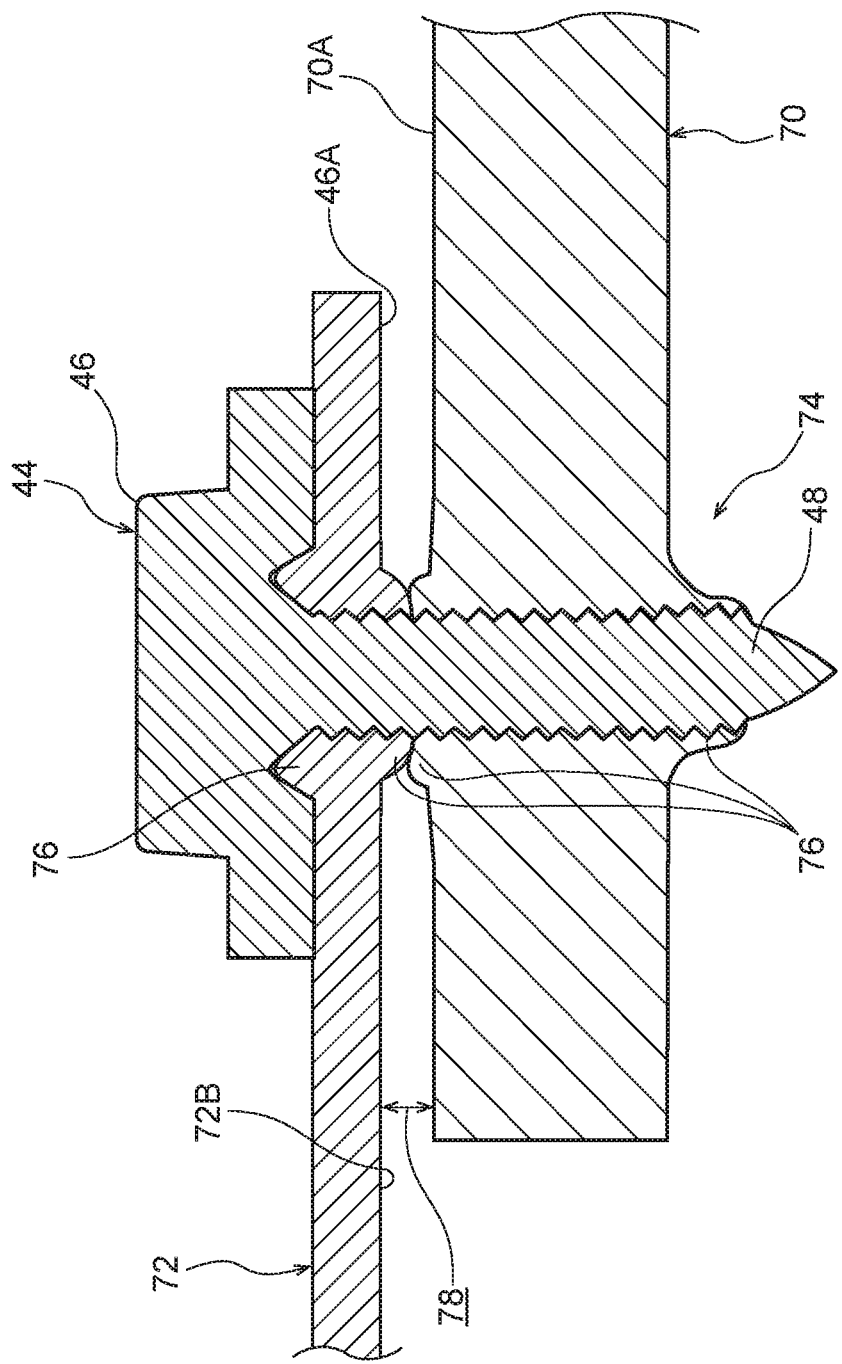
FIG. 4 is a vertical sectional view that is cut along the plate thickness direction and shows a plate member joining structure relating to a comparative example.

A plate member joining structure that serves as a comparative example is shown in FIG. 4. In this joining structure of the comparative example, in the same way as in the above-described embodiment, an end portion of an upper plate 72 is superposed on an end portion of a lower plate 70, the screw 44 is screwed-into the superposed end portions, and a joined portion 74 is formed. The lower plate 70 is formed in the shape of a flat plate of a uniform plate thickness. An upper surface 70A of the lower plate 70 is formed to be flat, and the first concave portion 18 of the present embodiment is not formed therein. On the other hand, the upper plate 72 as well is formed in the shape of a flat plate of a uniform plate thickness. A lower surface 72B of the upper plate 72 is formed to be flat, and the first convex portion 40 of the present embodiment is not formed thereat.

In the above-described plate member joining structure, at the time when the screw 44 is screwed-in, excess metal 76 is pushed-out between the lower plate 70 and the upper plate 72 by the screw 44. Therefore, a gap 78 forms between the lower plate 70 and the upper plate 72, and the rigidity and joining accuracy of the joined portion 74 deteriorate.

In contrast, in the present embodiment, the first concave portion 18 is formed in the upper surface 10A of the lower plate 10, and the first convex portion 40, which is formed at the lower surface 12B of the upper plate 12, is fit together with the first concave portion 18. The screw 44 is screwed-into the first concave portion 18 and the first convex portion 40. At this time, the regions of contact between the screw 44 and the lower plate 10 and the upper plate 12 are welded by the heat of the friction. Further, among these regions of contact, the excess metal 54 that is pushed-out toward the distal end side of the screw 44 functions as a so-called weld nut. Due thereto, the first concave portion 18 and the first convex portion 40 are joined by the screw 44 in the plate thickness direction.

Here, in the present embodiment, the first gap 42 is formed between the bottom surface 20 of the first concave portion 18 and the lower surface 40B of the first convex portion 40 that is disposed so as to face the bottom surface 20. Therefore, the excess metal 54, which is pushed-out between the first concave portion 18 and the first convex portion 40 by the screw 44, is accommodated in the first gap 42 (see FIG. 2). Due thereto, an unnecessary gap forming between the lower plate 10 and the upper plate 12 at the other regions of the lower plate 10 and the upper plate 12 can be suppressed.

Further, the contact surface area between the shaft portion 48 of the screw 44 and the lower plate 10 and the upper plate 12, i.e., the joined surface area that results from the joining, increases by an amount corresponding to the excess metal 54 that is accommodated in the first gap 42. Therefore, the joining strength is improved.

Moreover, in the present embodiment, at the joined portion 14, the first convex portion 40 that is formed at the lower surface 12B of the upper plate 12 is fit-together with the first concave portion 18 that is formed in the upper surface 10A of the lower plate 10. Therefore, the rigidity of the joined portion 14 can be improved as compared with a structure in which plate members that are flat-plate-shaped are superposed together and joined.

Moreover, at the joined portion 14 of the above-described structure, for example, if load F along the surface direction is inputted to the lower plate 10 as shown in FIG. 2, load is transmitted to the screw 44 via the region of contact between the screw 44 and the lower plate 10, and, in addition, load is transmitted to the upper plate 12 via the first concave portion 18 and the first convex portion 40 that are in a state of fitting-together (see arrow fin FIG. 2). Due thereto, the load that is applied to the joined portion 14 can be dispersed, and deformation of the joined portion 14 can be suppressed.

Further, in the present embodiment, the first concave portion 18 is provided in the upper surface 10A of the lower plate 10, and the first convex portion 40 is provided at the lower surface 12B of the upper plate 12, and the first convex portion 40 is fit-together with the first concave portion 18. Due thereto, the fit-together state of the lower plate 10 and the upper plate 12 can be obtained by a simple structure.

In the present embodiment, there is a structure in which the first concave portion 18 is formed in the shape of an upside-down truncated cone, and the first convex portion 40, which is formed in the shape of an upside-down truncated cone and is formed at the lower surface 12B of the upper plate 12, is fit-together with the first concave portion 18. Namely, the diameter of the inner side surface (the side surface 22) of the first concave portion 18 gradually increases from the bottom surface 20 of the first concave portion 18 toward the plate thickness direction upper side, and the first concave portion 18 and the first convex portion 40 are fit-together at surfaces that are inclined with respect to the plate thickness direction of the joined portion 14. Therefore, the first concave portion 18 and the first convex portion 40 can be fit-together while absorbing dispersion that arises at the time of the manufacturing thereof, as compared with a structure in which, for example, a concave portion and a convex portion are formed in the shapes of solid cylinders, and the concave portion and the convex portion are fit-together at side surfaces that run along the plate thickness direction. Due thereto, the workability of the joining process is good, and the mass produceability can be improved.

Further, in the present embodiment, the second concave portion 34 is formed in the upper surface 12A of the upper plate 12, and this second concave portion 34 is formed at a position that overlaps the first convex portion 40 that is formed at the lower surface 12B of the upper plate 12 as seen in a plan view. Therefore, in the state in which the lower plate 10 and the upper plate 12 are joined together, the screw 44 is in a state of being screwed-into the second concave portion 34 of the upper plate 12.

Here, in the present embodiment, the head portion 46 of the screw 44 abuts the peripheral edge portion (the large diameter portion 22A) of the second concave portion 34 that is formed in the upper surface 12A of the upper plate 12, and the second gap 52 is formed between the head portion 46 of the screw 44 and the bottom surface 36 of the second concave portion 34. Therefore, at the time of screwing the screw 44 into the upper plate 12, the excess metal 54 that is pushed-out toward the upper surface 12A side of the upper plate 12 is accommodated in the second gap 52 (see FIG. 2). Due thereto, an unnecessary gap being formed between the head portion 46 of the screw 44 and the upper plate 12 at the other regions of the head portion 46 and the upper plate 12 can be suppressed.

Namely, the amount of the excess metal 54 that is pushed-out toward the upper surface 12A side of the upper plate 12 increases proportionately to the plate thickness of the upper plate 12. In this case, if there is a structure in which the second concave portion 34 is not formed in upper surface 12A of the upper plate 12, the excess metal 54 that is pushed-out toward the upper surface 12A side is accommodated in the concave portion 50 that is formed in the lower surface 46A of the head portion 46 of the screw 44. However, if the excess metal 54 cannot all be accommodated in the concave portion 50, a gap forms between the head portion 46 of the screw 44 and the upper plate 12, and the contact surfaces of the head portion 46 and the upper plate 12 become unstable.

In contrast, in the present embodiment, the excess metal 54 can be accommodated in the above-described second gap 52. Namely, even if the amount of the excess metal 54 increases or decreases in accordance with the plate thickness of the upper plate 12, the contact surfaces of the head portion 46 of the screw 44 and the upper plate 12 are stably ensured. As a result, the joining strength between the lower plate 10 and the upper plate 12 can be stably ensured.

Further, the second concave portion 34 that is formed in the upper surface 12A and the first convex portion 40 that is formed at the lower surface 12B of the upper plate 12 are formed in one step by drawing using an unillustrated press mold. Therefore, the upper plate 12 can be machined in few steps, and the mass produceability can be improved.

Further, in the present embodiment, the second convex portion 24 is formed at the lower surface 10B of the lower plate 10, and, as seen in a plan view, this second convex portion 24 is formed at a position that overlaps the first concave portion 18 that is formed in the upper surface 10A of the lower plate 10. Therefore, in the state in which the lower plate 10 and the upper plate 12 are joined together, the screw 44 is in a state of being screwed-into the second convex portion 24 of the lower plate 10. As a result, the range of contact between the lower plate 10 and the shaft portion 48 of the screw 44 can be enlarged in the axial direction of the screw, as compared with a case in which the lower surface 10B of the lower plate 10 is formed to be flat. Namely, the pitch, along the axial direction of the shaft portion 48 of the screw, that is supported by the lower plate 10 and the upper plate 12 can be increased. Due thereto, the supporting rigidity of the screw 44 by the lower plate 10 and the upper plate 12 increases, and accordingly, this contributes to an improvement in the joining strength of the joined portion 14.

Further, the first concave portion 18 that is formed in the upper surface 10A and the second convex portion 24 that is formed at the lower surface 10B of the lower plate 10 are formed in one step by drawing using an unillustrated press mold. Therefore, the lower plate 10 can be machined in few steps, and the mass produceability can be improved.

Further, the plate member joining structure of the present embodiment is structured by forming concave surfaces that are shaped as upside-down truncated cones, by subjecting the upper surface 10A of the lower plate 10 and the upper surface 12A of the upper plate 12 to drawing. Therefore, the cross-sectional rigidity of the joined portion is increased without increasing the plate thicknesses of the plate members. Moreover, the pitch, along the axial direction of the shaft portion 48 of the screw 44, that is supported by the lower plate 10 and the upper plate 12 can be increased. Namely, the rigidity of the joined portion can be ensured even when joining plate members whose plate thicknesses are relatively thin. Therefore, both a lightening of weight of and an ensuring of the rigidity of the joined portion can be achieved.

Supplemental Description of Above-Described Embodiment

Figure 5A:
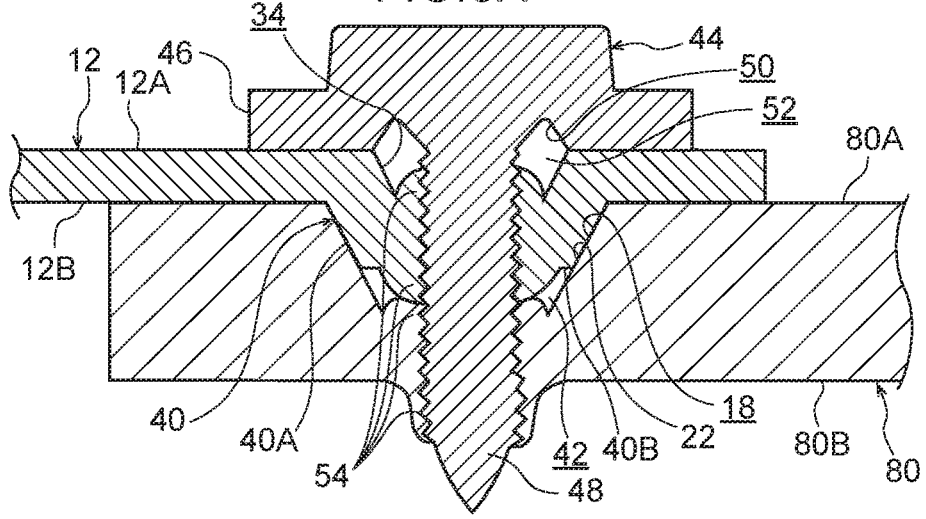
FIG. 5A is a vertical sectional view that corresponds to FIG. 2 and shows a modified example of the lower plate.

The above-described embodiment is structured such that the second convex portion 24 is provided at the lower surface 10B of the lower plate 10. However, the present disclosure is not limited to this and may be structured such that, as with the lower plate 80 that is shown in FIG. 5A, a convex portion is not provided at a lower surface 80B of the lower plate 80. Namely, the lower surface 80B may be formed to be flat. In this case, the first concave portion 18 that is formed in an upper surface 80A of the lower plate 80 is formed by carrying out cutting work on the upper surface 80A. Or, there may be a structure in which the first concave portion 18 is formed in the upper surface 80A by manufacturing the lower plate 80 by casting.

Figure 5B:
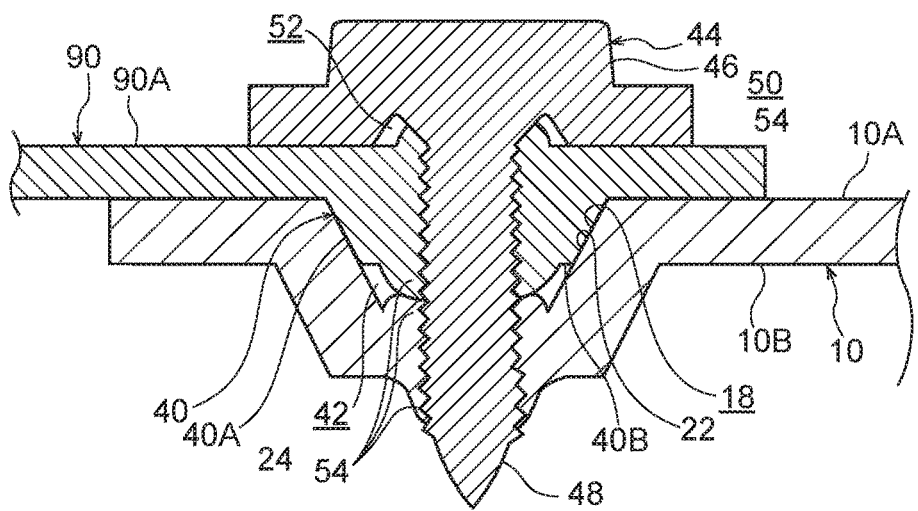
FIG. 5B is a vertical sectional view that corresponds to FIG. 2 and shows a modified example of the upper plate.

Further, the above-described embodiment is structured such that the second concave portion 34 is provided in the upper surface 12A of the upper plate 12. However, the present disclosure is not limited to this, and, as with an upper plate 90 that is shown in FIG. 5B, may be structured such that a concave portion is not provided in an upper surface 90A of the upper plate 90. Namely, the upper surface 90A may be formed to be flat. In this case, the upper plate 90 is manufactured by casting.

Further, in the above-described embodiment, the first concave portions 18 and the second concave portion 34 that are formed in the upper surface 10A of the lower plate 10 and the upper surface 12A of the upper plate 12 are formed in shapes of upside-down truncated cones. However, the present disclosure is not limited to this, and, for example, concave portions that are cylindrical, pillar-shaped or hemispherical may be formed. Further, in correspondence therewith, the convex portions that are formed at the lower surface of the lower plate and the lower surface of the upper plate may be formed to be cylindrical, pillar-shaped, or hemispherical.

Figure 5C:
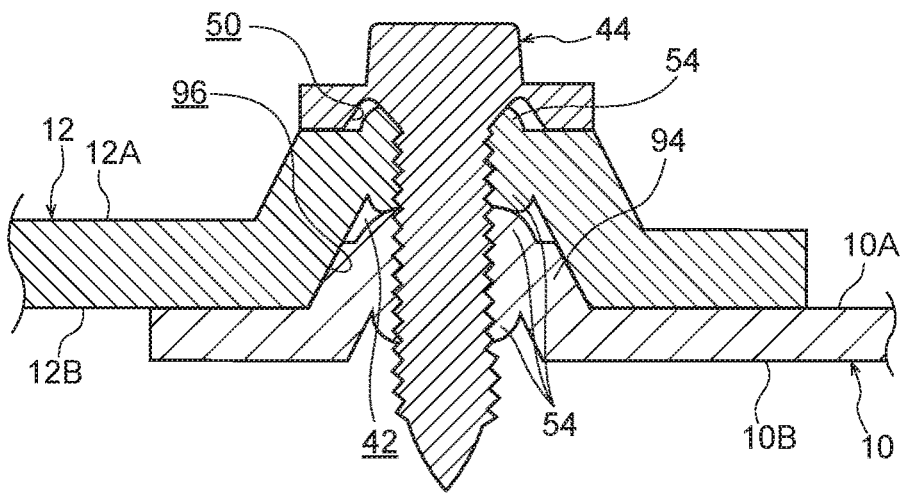
FIG. 5C is a vertical sectional view that corresponds to FIG. 2 and shows a modified example of a fitting base portion that is formed in an upper surface of the lower plate and a fitting portion that is formed at a lower surface of the upper plate.

The above-described embodiment is structured such that the first concave portion 18 is formed in the upper surface 10A of the lower plate 10 and the convex portion is formed at the lower surface 12B of the upper plate 12. However, the present disclosure is not limited to this. For example, as in the joining structure shown in FIG. 5C, a convex portion 94 may be formed at the upper surface 10A of the lower plate 10, and a concave portion 96 may be formed in the lower surface 12B of the upper plate 12. This convex portion 94 is formed in the shape of a truncated cone whose diameter gradually decreases from the upper surface 1 OA of the lower plate 10 toward the plate thickness direction upper side. Further, the concave portion 96 is formed in the shape of a truncated cone whose diameter gradually decreases from the lower surface 12B of the upper plate 12 toward the plate thickness direction upper side. However, the convex portion 94 may be cylindrical, pillar-shaped or hemispherical, and the concave portion 96 may be cylindrical, pillar-shaped or hemispherical, in correspondence therewith.

What is claimed is:

1. A plate member joining structure, comprising:
a lower plate that is made of metal, a fitting base portion being formed at an upper surface of the lower plate;
an upper plate that is made of metal, that is disposed on and in contact with the upper surface of the lower plate, and that has a fitting insert portion that is fitted to the fitting base portion so as to form a first gap between a lower surface of the fitting insert portion and a surface of the fitting base portion facing the lower surface of the fitting insert portion; and
a screw,
wherein, in an unscrewed state in which the screw is not screwed into the fitting insert portion, the fitting insert portion is received within the fitting base portion,
wherein, in a screwed state in which the screw is screwed into the fitting insert portion and the fitting base portion, the screw joins the fitting insert portion and the fitting base portion together in a plate thickness direction, the screw pushes excess metal into the first gap by being screwed into the fitting base portion and the fitting insert portion.

2. The plate member joining structure of claim 1, wherein:
the fitting base portion is a first concave portion that is formed at the upper surface of the lower plate, and
the fitting insert portion is a first convex portion that is formed at a lower surface of the upper plate.

3. The plate member joining structure of claim 2, wherein:
the first concave portion is formed in a shape of an upside-down truncated cone, and
the first convex portion is formed in a shape of an upside-down truncated cone.

4. The plate member joining structure of claim 2, wherein a second concave portion is formed at an upper surface of the upper plate at a position corresponding to the first convex portion as seen in a plan view, and, when in the screwed state, a head portion of the screw abuts a peripheral edge portion of the second concave portion at the upper surface of the upper plate, and a second gap is formed between the head portion of the screw and a bottom surface of the second concave portion.

5. The plate member joining structure of claim 2, wherein a second convex portion is formed at a lower surface of the lower plate at a position that, as seen in a plan view, corresponds to the first concave portion that is formed in the upper surface of the lower plate.

6. A plate member joining structure, comprising:
a lower plate that is made of metal, a fitting base portion being formed at an upper surface of the lower plate;
an upper plate that is made of metal, that is disposed on and in contact with the upper surface of the lower plate, and that has a fitting insert portion that is fitted to the fitting base portion so as to form a first gap between a lower surface of the fitting insert portion and a surface of the fitting base portion facing the lower surface of the fitting insert portion; and
a screw,
wherein, in an unscrewed state in which the screw is not screwed into the fitting insert portion, the fitting insert portion is fitted to the fitting base portion, the fitting base portion is a first concave portion that is formed at the upper surface of the lower plate, the first concave portion is formed in a shape of an upside-down truncated cone,
wherein, in the unscrewed state, the fitting insert portion is a first convex portion that is formed at a lower surface of the upper plate, the first convex portion is formed in a shape of an upside-down truncated cone,
wherein in a screwed state in which the screw is screwed into the fitting insert portion and the fitting base portion, the screw joins the fitting insert portion and the fitting base portion together in a plate thickness direction.

7. The plate member joining structure of claim 6, wherein a second concave portion is formed at an upper surface of the upper plate at a position corresponding to the first convex portion as seen in a plan view, and, when in the screwed state a head portion of the screw abuts a peripheral edge portion of the second concave portion at the upper surface of the upper plate, and a second gap is formed between the head portion of the screw and a bottom surface of the second concave portion.

8. The plate member joining structure of claim 6, wherein a second convex portion is formed at a lower surface of the lower plate at a position that, as seen in a plan view, corresponds to the first concave portion that is formed in the upper surface of the lower plate.

9. A plate member joining structure, comprising:
a lower plate that is made of metal, a fitting base portion being formed at an upper surface of the lower plate;

an upper plate that is made of metal, that is disposed on the upper surface of the lower plate, and that has a fitting insert portion that is fitted to the fitting base portion so as to form a first gap between a lower surface of the fitting insert portion and a surface of the fitting base portion facing the lower surface of the fitting insert portion; and a screw that, in a state in which the fitting insert portion is fitted to the fitting base portion, is screwed into the fitting insert portion and the fitting base portion, and joins the fitting insert portion and the fitting base portion together in a plate thickness direction, wherein the fitting base portion is a first concave portion that is formed at the upper surface of the lower plate, wherein the fitting insert portion is a first convex portion that is formed at a lower surface of the upper plate, and wherein a second concave portion is formed at an upper surface of the upper plate at a position corresponding to the first convex portion as seen in a plan view, and, in a state in which the screw is screwed into the second concave portion, a head portion of the screw abuts a peripheral edge portion of the second concave portion at the upper surface of the upper plate, and a second gap is formed between the head portion of the screw and a bottom surface of the second concave portion.

10. The plate member joining structure of claim 9, wherein:

the first concave portion is formed in a shape of an upside-down truncated cone, and the first convex portion is formed in a shape of an upside-down truncated cone.

11. The plate member joining structure of claim 9, wherein a second convex portion is formed at a lower surface of the lower plate at a position that, as seen in a plan view, corresponds to the first concave portion that is formed in the upper surface of the lower plate.

* * * * *

UNITED STATES PATENT AND TRADEMARK OFFICE
CERTIFICATE OF CORRECTION

PATENT NO. : 11,015,634 B2
APPLICATION NO. : 16/502592
DATED : May 25, 2021
INVENTOR(S) : Shigeru Inamori Page 1 of 1

It is certified that error appears in the above-identified patent and that said Letters Patent is hereby corrected as shown below:

In the Claims

Column 11, Line(s) 36, delete "1 OA" and insert --10A--, therefor.

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*